United States Patent [19]
Karafillis et al.

[11] Patent Number: 5,846,035
[45] Date of Patent: Dec. 8, 1998

[54] DAMAGE RESISTANT DRILL

[75] Inventors: Apostolos Pavlos Karafillis, Niskayuna; Steven Robert Hayashi, Schenectady, both of N.Y.

[73] Assignee: General Electric Company, Schenectady, N.Y.

[21] Appl. No.: 893,485

[22] Filed: Jul. 11, 1997

[51] Int. Cl.$^6$ ................................................. B23B 35/00
[52] U.S. Cl. ........................ 408/1 R; 408/227; 408/230
[58] Field of Search ................................ 408/1 R, 230, 408/227, 229

[56] References Cited

U.S. PATENT DOCUMENTS

| 4,602,900 | 7/1986 | Arpaio, Jr. et al. | 408/230 |
| 4,878,788 | 11/1989 | Wakihira et al. | 408/230 |
| 4,948,306 | 8/1990 | Wiedner et al. | 408/229 |

FOREIGN PATENT DOCUMENTS

| 40208 | 3/1983 | Japan | 408/230 |
| 185507 | 8/1988 | Japan | 408/230 |
| 124208 | 5/1990 | Japan | 408/230 |
| 1151375 | 4/1985 | Sweden | 408/230 |

OTHER PUBLICATIONS

*Tool and Manufacturing Engineer's Handbook*, vol. 1, ix, 9–14 – 9–47; 10–24 – 10–40 (Thomas J. Drozda et al. Eds. 4th ed. 1983).
*Twist Drills*, ASME Standard B94.11M–1993 (1994).
E.J.A. Armarego et al., *Predictive Force Models for Point–Thinned and Circular Centre Edge Twist Drill Designs*, 45 Annals of the CIRP 65–70 (1996).

G. Spur and J.R. Masuha, *Drilling With Twist Drills of Different Cross Section Profiles*, 30 Annals of the CIRP 31–35 (1981).
Tetsutaro Hoshi et al. *Study of High Performance Drill Geometry*, 38 Annals of the CIRP 87–90 (1989).
E.J.A. Armarego et al., *Four Plane Facet Point Drills— Basic Design and Cutting Model Predictions*, 39 Annals of the CIRP 41–45 (1990).
A. Bhattacharyya et al., *Chisel–Edge Modification of Small HSS and Carbide Drills for Improved Machinability*, 30 Annals of the CIRP 21–25 (1981).
M.F. DeVries et al., *An Investigation of the Cutting Mechanisms of the New Point Drill*, 37 Annals of the CIRP 73–78 (1988).

*Primary Examiner*—Daniel W. Howell
*Assistant Examiner*—Adesh Bhargava
*Attorney, Agent, or Firm*—Tyler Maddry; Noreen C. Johnson

[57] ABSTRACT

A drill according to an exemplary embodiment of the invention comprises a shank from which the drill is driven; a body connected to the shank, the body having a surface; a flute in the body; a cutting edge at a drill point; and a peripheral relief surface which extends outwardly from the surface of the body to an outer circumference of the drill, wherein the peripheral relief surface, for a cross section of the drill perpendicular to a drill axis, intersects the outer circumference at a peripheral point at an edge of the flute. The drill has an improved capacity to withstand a loss of coolant during drilling without severe overheating of the drill or workpiece and with little damage to the drill and workpiece.

18 Claims, 1 Drawing Sheet

DAMAGE RESISTANT DRILL

BACKGROUND

1. Field of the Invention

The present invention relates generally to drills, and more particularly to a drill having a geometry which protects the drill from being damaged by overheating, for example in the case of a loss of coolant.

2. Description of the Related Art

In many drilling applications, important advantages are derived by providing a fluid coolant to the drilling area during drilling. For example, directing coolant to the cutting edge of the drill substantially reduces friction and temperatures at the drill/workpiece interface, which reduces wear and lengthens drill life. Providing fluid coolant to the drill also improves chip removal, which increases productivity by eliminating the need to interrupt the drilling cycle periodically to remove chips.

In addition to cost considerations, the use of fluid coolant provides the important advantage of superior surface integrity of the drilled hole by elimination of chipping and cracking of materials. The surface integrity can be particularly important in industries concerned with safety, for example the aircraft industry, because small cracks on the surface of the hole can propagate into the component. A hole of compromised surface integrity may therefore significantly decrease the fatigue life of a structural component subject to cyclic stresses.

Commensurate with the advantages provided by fluid cooling, are the disadvantages which arise if the coolant flow is unexpectedly interrupted, which occasionally occurs during drilling operations. The interruption of coolant flow in the cutting area of the drill has two immediate effects, a significant reduction of the heat removal rate from the cutting area, and a loss of lubricity in the contact areas between the drill and the workpiece. Other derivative effects of the interruption of coolant flow include a rise in temperature of the drill and workpiece, accelerated wearing of and damage to the drill, fracture of the drill, and deterioration of the surface integrity of the hole. The loss of coolant may be very costly where the drilled part is a structural component subject to cyclic stresses, since it may require that a part be discarded for safety reasons due to poor surface integrity.

It would be desirable, therefore, to have a drill which would resist damage upon loss of coolant, machine with low drill and workpiece temperatures, and produce a hole having superior surface integrity.

SUMMARY

A drill according to an exemplary embodiment of the invention comprises a shank from which the drill is driven; a body connected to the shank, the body having a surface; a flute in the body; a cutting edge at a drill point; and a peripheral relief surface which extends outwardly from the surface of the body to an outer circumference of the drill, wherein the peripheral relief surface, for a cross section of the drill perpendicular to a drill axis, intersects the outer circumference at a peripheral point at an edge of the flute. The drill has an improved capacity to withstand a loss of coolant during drilling without severe overheating of the drill or workpiece and with little damage to the drill and workpiece.

BRIEF DESCRIPTION OF THE DRAWINGS

Other features and advantages of the invention will be more readily understood upon reading the following detailed description in conjunction with the drawings, in which.

DETAILED DESCRIPTION OF THE PREFERRED EMBODIMENTS

Figure 1:
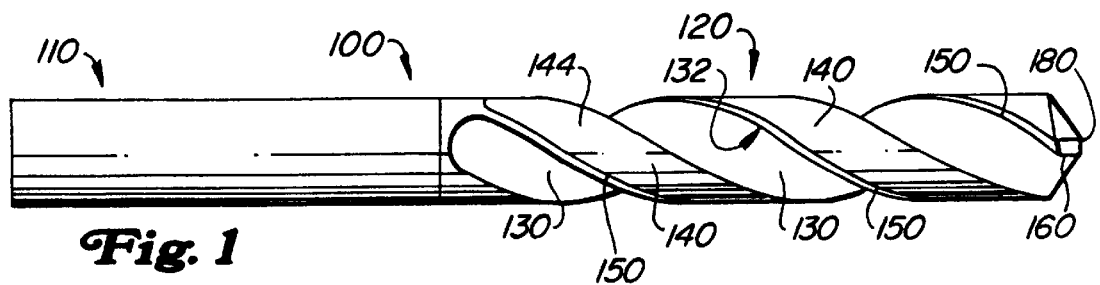
FIG. 1 is a side view of a drill according to an exemplary embodiment of the invention.

FIG. 1 illustrates a drill according to an exemplary embodiment of the invention. The drill 100 includes a shank 110 which is gripped by a rotation device to drive the drill 100, and a body 120 with which the drilling is performed. The body 120 includes flutes 130 to permit removal of chips and to allow coolant to flow to the cutting edge of the drill. The drill 100 may include any desired number of flutes, for example two, three, or four which are in the form of helical grooves in the body 120.

The body 120 includes what is conventionally known as a land 140, the portion of the drill body between adjacent flutes. The land 140 may include an inner portion 144 which is generally cylindrical. At the edge of each land 140 extending from the inner portion 144 is a peripheral relief surface 150, the shape of which will be discussed below. One end of the drill includes at least one drill cutting edge or lip 160. The cutting edge 160 extends roughly from the point 180 of the drill to the perimeter of the drill, as is seen more clearly in FIG. 2.

The drill is typically fluid cooled by flood cooling, i.e., by projecting a stream of fluid coolant at the drill above the hole during drilling. For example, the drill 100 may be aligned vertically with its point 180 down so that the fluid coolant, upon hitting the drill, falls down into the hole. Those skilled in the art will also recognize that other methods of supplying the fluid coolant, for example coolant fed drills, may be implemented in conjunction with exemplary embodiments of the invention.

Figure 2:
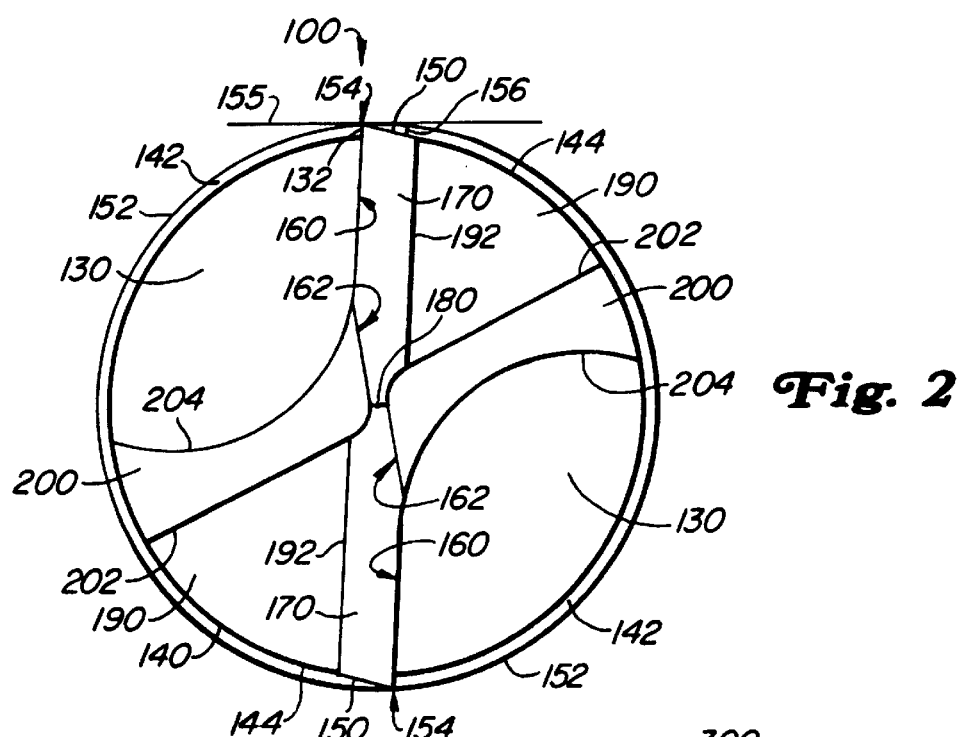
FIG. 2 is an end view of the point of the drill shown in FIG. 1.

FIG. 2 shows the drill 100 from its point 180. The drill 100 includes three pairs of planar faces and a pair of flutes 130. A pair of first planar faces 170 (conventionally termed "flank faces" or "primary clearance faces") meet at the point 180 in the center of the drill 100. On one side of the first planar face 170 are two drill cutting edges 160 and 162. The two cutting edges 160 and 162 shown in FIG. 2 are formed as a conventional split point drill. A pair of second planar faces 190 (conventionally termed "secondary clearance faces") are adjacent to the pair of first planar faces 170, meeting at an edge 192. A pair of third planar faces 200 (conventionally termed "gashes") are adjacent to the pair of second planar faces 190, meeting at an edge 202. The pair of third planar faces 200 also intersects the pair of flutes 130 at an edge 204.

The relief angle (the angle between the planar face and a plane normal to the drill rotation axis) of the first planar faces 170 is typically less than the relief angle of the second planar faces 190 which is typically less than the relief angle of the third planar faces 200. The point angle (defined as the angle included between the cutting edges 160 projected upon a plane parallel to the drill axis and parallel to the cutting edges 160) is less than 180°, for example between about 100° and 145°, typically about 118° or 135°. While a split-point is typically used, other types of drill points, such as single-angle points, double-angle points, reduced rake points, helical points, multi-facet points, and rounded edge points can be used in exemplary embodiments of the invention. These types of drill points are described, for example, in *Tool and Manufacturing Engineer's Handbook*, Vol. 1, Chapter 9, Society of Manufacturing Engineers (Thomas J. Drozda & Charles Wick eds., 4$^{th}$ ed. 1983).

Exemplary embodiments of the invention include a peripheral relief surface 150 which provides significant advantages in the event of a loss of fluid coolant. The peripheral relief surface 150 extends outwardly from the inner portion 144 of the land 140 and intersects the edge 132 of the flute 130 to define an outer circumference 152 along a helical line. As shown in FIG. 2, the outer circumference 152 has a radius which is greater than a radius of the inner portion 144 of the land. The smaller radius of the inner portion 144 thus provides a clearance 142 between the inner portion 144 of the land 140 and the hole being drilled. According to one embodiment, the arc length of the outer circumference 152 corresponding to each peripheral relief surface 150 is between about 0.010 and about 0.020 inch, and the diameter of the drill is about 0.323 inch. Each peripheral relief surface therefore has a width which corresponds to between about 3.5° and about 7° of the circumference of the drill.

As shown in FIG. 2, the peripheral relief surface 150 extends outwardly from the inner portion 144 of the land 140 to meet the outer circumference 152 at a peripheral point 154 at the edge of the flute. The peripheral relief surface 150 provides a relief angle 156 between a tangent 155 to the outer circumference 152 and the peripheral relief surface 150. The relief angle 156 may be between about 3 degrees and about 12 degrees, for example, and is typically about 8 degrees. The peripheral relief surface 150, therefore, has little surface contact with the hole being drilled, defined by the outer circumference 152. Each peripheral relief surface 150 contacts the hole being drilled along a helical line defined by the peripheral point 154.

The peripheral point 154 in practice may occupy a very small non-zero arc length of the outer circumference 152. For example, the arc length of the outer circumference which the peripheral point occupies may range from zero to 0.005 inch (about 1.8 degrees on a fixed diameter drill of 0.323 inch diameter). Typically the arc length is less than about 0.001–0.002 inch (0.35–0.7 degrees on a 0.323 inch diameter drill). Because the arc length is small, there is little surface contact between the peripheral point 154 and the hole being drilled.

Figure 3:
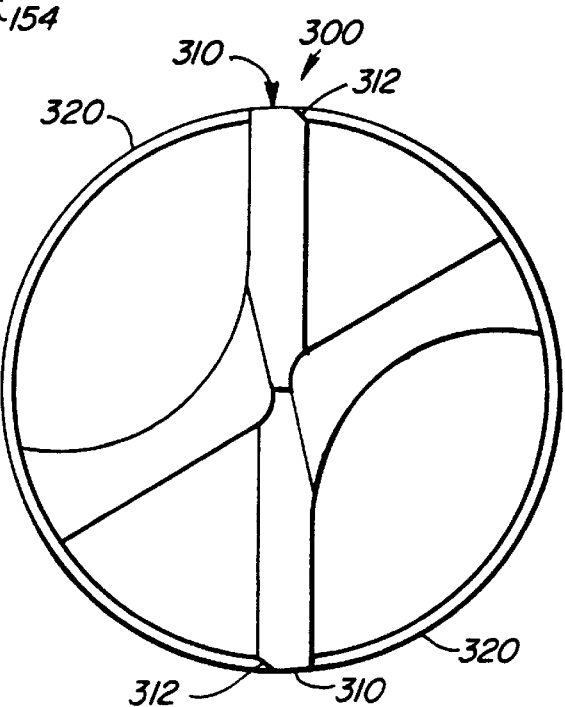
FIG. 3 is an end view of a conventional drill.

FIG. 3 illustrates a drill geometry according to the conventional National Aerospace Standard (NAS) 907. The drill 300 shown in FIG. 3 includes a transition portion 312 and a margin 310 comprising an outer cylindrical surface. The outer cylindrical surface of the margin 310 contacts the hole being drilled, which is defined by an outer circumference 320, over a large surface area. Typically, each margin 310 of the conventional drill 300 occupies about 5 degrees of the outer circumference, for example an arc length of 0.015 inch on a fixed-diameter drill of diameter 0.323 inch. In the event of loss of coolant, the drill 300 experiences a severe reduction in heat removal rate from the cutting area and a loss of lubricity in the contact area between the drill and the workpiece. These effects produce a significant rise in the temperature of the drill and the workpiece, accelerated damage and wear to the drill, fracture of the drill, and deterioration of the surface integrity of the drilled hole.

Experimental results by the inventors have confirmed that the heat resistant drill 100 of FIGS. 1 and 2 vastly outperforms the conventional drill 300 of FIG. 3 in the event of a loss of coolant. The experimental drilling operations involved the machining of bolt holes in components of aircraft engines consisting of Rene 88DT, a nickel superalloy with a tungsten carbide two-flute drill of low helix angle. The temperature of the drill point was measured at the exit of a 0.34 inch deep through hole. The drill diameter was equal to 0.323 inches, and the spindle rate was 414 RPM.

For the conventional drill 300 of FIG. 3, severe overheating was observed upon the loss of coolant. After four holes drilled with coolant and nine holes drilled without coolant, the temperature at the point of the drill 300 while exiting from the hole was measured to be 975° Celsius. Severe damage to the drill 300 was observed. The temperature of the drill point when drilling with coolant was measured to be 325° Celsius.

The heat resistant drill 100 shown in FIGS. 1 and 2 withstood a loss of coolant for at least 9 holes without overheating (defined as the development of temperatures (°C.) higher than double the temperature developed with coolant), and with only minor drill damage. After four holes drilled with cooling fluid and nine holes drilled without cooling fluid, the temperature at the point 180 of the heat resistant drill 100 while exiting from the hole was measured to be 625° Celsius. The temperature of the drill point of the heat resistant drill 100 when drilling with coolant was measured to be about 325° Celsius. The arc on the outer circumference 152 occupied by the peripheral point 154 of the drill 100 was less than 0.35 degrees (<0.001 inch on a fixed diameter drill of diameter 0.323 inch).

The overheating of the conventional drill 300 and the workpiece is associated with the development of a layer of welded workpiece material on the margin 310 of the drill. The thickness of the workpiece material layer was observed to be 0.0005 inches on the conventional drill 300 at the initiation of the overheating phenomena. This layer causes an interference between the margin of the drill and the workpiece. The interference leads to the development of high contact normal stresses between the margin 310 of the drill 300 and the walls of the hole. The high contact normal stresses cause high frictional (rubbing) stresses which lead to overheating and margin deterioration.

In the case that overheating occurs, there is a substantial amount of twist torque consumed by the conventional drill 300 after it has drilled through the hole and keeps spinning at the same spindle speed as when removing material. The existence of substantial twist torque indicates the existence of interference between the margin 310 of the drill 300 and the workpiece, due to the development of the layer of welded workpiece material on the margin 310 of the conventional drill 300. The substantial twist torque is also caused by differential thermal expansion of the drill and workpiece. The drill becomes hotter and expands more than the hole in the workpiece, which results in an interference fit between them.

Finite element analysis predicts that an interference of 0.001 inches between a conventional drill and the workpiece can cause contact normal stresses as high as 510 MPa between the drill 300 and the workpiece. These contact normal stresses explain the development of overheating due to frictional (rubbing) stresses.

The geometry of the peripheral relief surface 150 of the exemplary drill shown in FIGS. 1 and 2 enhances the cutting action of the drill, thereby retarding or eliminating the development of a welded workpiece material layer on the peripheral relief surface 150 of the drill 100, and reducing the development of high contact pressures along the peripheral relief surface of the drill. As a result, the drill does not overheat while drilling. The magnitude of the thermal residual stresses on the workpiece is reduced, which improves the fatigue resistance of the workpiece. Because the cutting action of the drill is enhanced, the motion of the drill with respect to the workpiece is typically controlled with a machine tool which prevents transverse motion of the drill.

The geometry of the peripheral relief surface 150 also provides the advantage that the spindle power needed to rotate the drill is more constant than in conventional drills. In applications where process monitoring is used to assure workpiece integrity or to monitor tool life, the torque or power required to turn the drill is typically used to assess the state of the drilling process. A relatively constant spindle power or torque results in tighter control of the process and fewer alarms from the monitoring equipment. A relatively constant spindle power also reduces vibrations caused by reaction torques which are transmitted into the system.

While the invention has been described with reference to exemplary embodiments, it will be understood by those skilled in the art that various changes and modifications may be made without departing from the scope of the invention. It is intended that the invention not be limited to the particular embodiments disclosed, but that the invention will include all embodiments falling within the scope of the appended claims.

What is claimed is:

1. A drill comprising:
    a shank from which the drill is driven;
    a body connected to the shank, the body having a cylindrical surface;
    a flute in the body;
    a cutting edge at a drill point; and
    a peripheral relief surface which extends outwardly from the cylindrical surface of the body to an outer circumference of the drill, wherein the peripheral relief surface, for a cross section of the drill perpendicular to a drill axis, intersects the outer circumference at a peripheral point at an edge of the flute, wherein the peripheral point occupies a non-zero arc length on the outer circumference, the arc length being less than about 1.8 degrees.

2. The drill of claim 1, wherein a point angle of the drill point is less than 180 degrees.

3. The drill of claim 1, wherein the point angle of the drill point is between about 100 degrees and 145 degrees.

4. The drill of claim 1, wherein a relief angle between the peripheral relief surface and a tangent to the outer circumference is between about 3 degrees and about 12 degrees.

5. The drill of claim 4, wherein the relief angle is about 8 degrees.

6. The drill of claim 1, wherein the drill point is a split point.

7. The drill of claim 1, wherein the peripheral point occupies an arc of less than about 0.7 degrees on the outer circumference.

8. The drill of claim 1, wherein the peripheral point occupies an arc of about zero degrees on the outer circumference.

9. A heat resistant drill comprising:
    a body having a cylindrical surface defined by a first radius;
    a flute formed helically in the body;
    a cutting edge formed at a drill point; and
    a peripheral relief surface, extending outwardly from the cylindrical surface of the body to an outer circumference defined by a second radius, wherein the peripheral relief surface meets the outer circumference along a helical line, and the helical line has a width which occupies a non-zero arc length on the outer circumference, the arc length being less than about 1.8 degrees.

10. The heat resistant drill of claim 9, wherein a point angle of the drill point is less than 180 degrees.

11. The heat resistant drill of claim 9, further comprising a second flute, wherein the flute and the second flute form a double helix.

12. The heat resistant drill of claim 11, further comprising a third flute, wherein the flute, the second flute, and the third flute form a triple helix.

13. The heat resistant drill of claim 9 wherein the drill point is a split point having a point angle between about 100 degrees and about 145 degrees.

14. The heat resistant drill of claim 9, wherein the helical line has a width which occupies less than about 0.7 degrees of the outer circumference.

15. The heat resistant drill of claim 9, wherein the helical line has a width which occupies about zero degrees of the outer circumference.

16. A method of drilling comprising the steps of:
    rotating a drill point having a cutting edge; and
    reducing friction between the drill and a drilled hole by forming a relief angle between a tangent to an outer circumference of the drill and a peripheral relief surface of the drill, which peripheral relief surface extends from a cylindrical surface of a body of the drill and intersects the outer circumference of the drill at a peripheral point at an edge of a flute of the drill, wherein the peripheral point occupies a non-zero arc length on the outer circumference, the arc length being less than about 1.8 degrees.

17. The method of claim 16, further comprising the step of forming the relief angle to be between about 3 degrees and about 12 degrees.

18. The method of claim 16, wherein a point angle of the drill point is less than 180 degrees.

* * * * *